United States Patent
Azumi et al.

(10) Patent No.: US 9,798,415 B2
(45) Date of Patent: Oct. 24, 2017

(54) DISPLAY DEVICE USING AT LEAST TWO TYPES OF DISPLAY PERIODS WITH DIFFERENT LENGTHS

(71) Applicant: Japan Display Inc., Minato-ku (JP)

(72) Inventors: Kohei Azumi, Tokyo (JP); Hidetoshi Komatsu, Tokyo (JP); Jin Ota, Tokyo (JP); Hiroshi Mizuhashi, Tokyo (JP)

(73) Assignee: Japan Display Inc., Minato-ku (JP)

( * ) Notice: Subject to any disclaimer, the term of this patent is extended or adjusted under 35 U.S.C. 154(b) by 132 days.

(21) Appl. No.: 14/851,319

(22) Filed: Sep. 11, 2015

(65) Prior Publication Data

US 2016/0085363 A1 Mar. 24, 2016

(30) Foreign Application Priority Data

Sep. 18, 2014 (JP) ................................. 2014-189705

(51) Int. Cl.
*G06F 3/041* (2006.01)
*G09G 3/36* (2006.01)

(52) U.S. Cl.
CPC ......... *G06F 3/0416* (2013.01); *G09G 3/3607* (2013.01); *G09G 3/3674* (2013.01); *G09G 3/3685* (2013.01); *G06F 2203/04108* (2013.01); *G09G 2300/0426* (2013.01); *G09G 2300/0809* (2013.01); *G09G 2310/08* (2013.01)

(58) Field of Classification Search
CPC .......... G06F 3/041–3/047; G06F 2203/04108; G09G 3/3607; G09G 3/3674; G09G 3/3685; G09G 2300/0809; G09G 2310/08; G09G 2300/0426

See application file for complete search history.

(56) References Cited

U.S. PATENT DOCUMENTS

| | | | | |
|---|---|---|---|---|
| 5,075,793 A * | 12/1991 | Schiffner | ............... | H04B 10/60 398/152 |
| 6,885,855 B1 * | 4/2005 | Vuoppola | ............... | H03F 3/195 455/303 |
| 2009/0009495 A1 * | 1/2009 | Jeon | ...................... | G06F 3/1438 345/204 |
| 2009/0135173 A1 * | 5/2009 | Nakatsuka | ........... | G09G 3/2081 345/212 |
| 2012/0050217 A1 | 3/2012 | Noguchi et al. | | |
| 2013/0057511 A1 * | 3/2013 | Shepelev | ................ | G06F 3/044 345/174 |

FOREIGN PATENT DOCUMENTS

JP 2012-048295 3/2012

* cited by examiner

*Primary Examiner* — Larry Sternbane
(74) *Attorney, Agent, or Firm* — Oblon, McClelland, Maier & Neustadt, L.L.P.

(57) ABSTRACT

According to one embodiment, a display device includes a plurality of display elements arranged in a matrix, a plurality of scanning lines, a plurality of signal lines, and a controller configured to control display by sequentially supplying an image signal and a control signal to the plurality of signal lines and the plurality of scanning lines, respectively, wherein the controller repeats a display period in which the display is controlled and a display blanking period in which the display is paused to display a frame image, and at least two types of display periods with different lengths are used when a frame image is displayed.

15 Claims, 11 Drawing Sheets

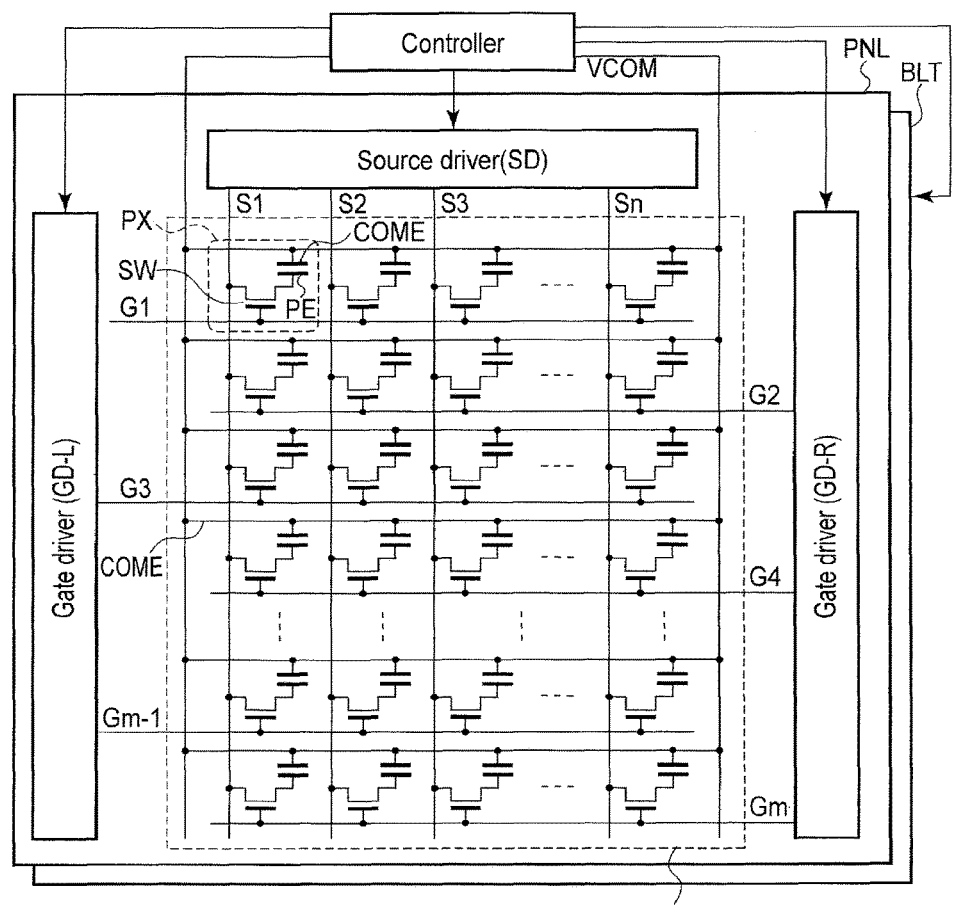
F I G. 1

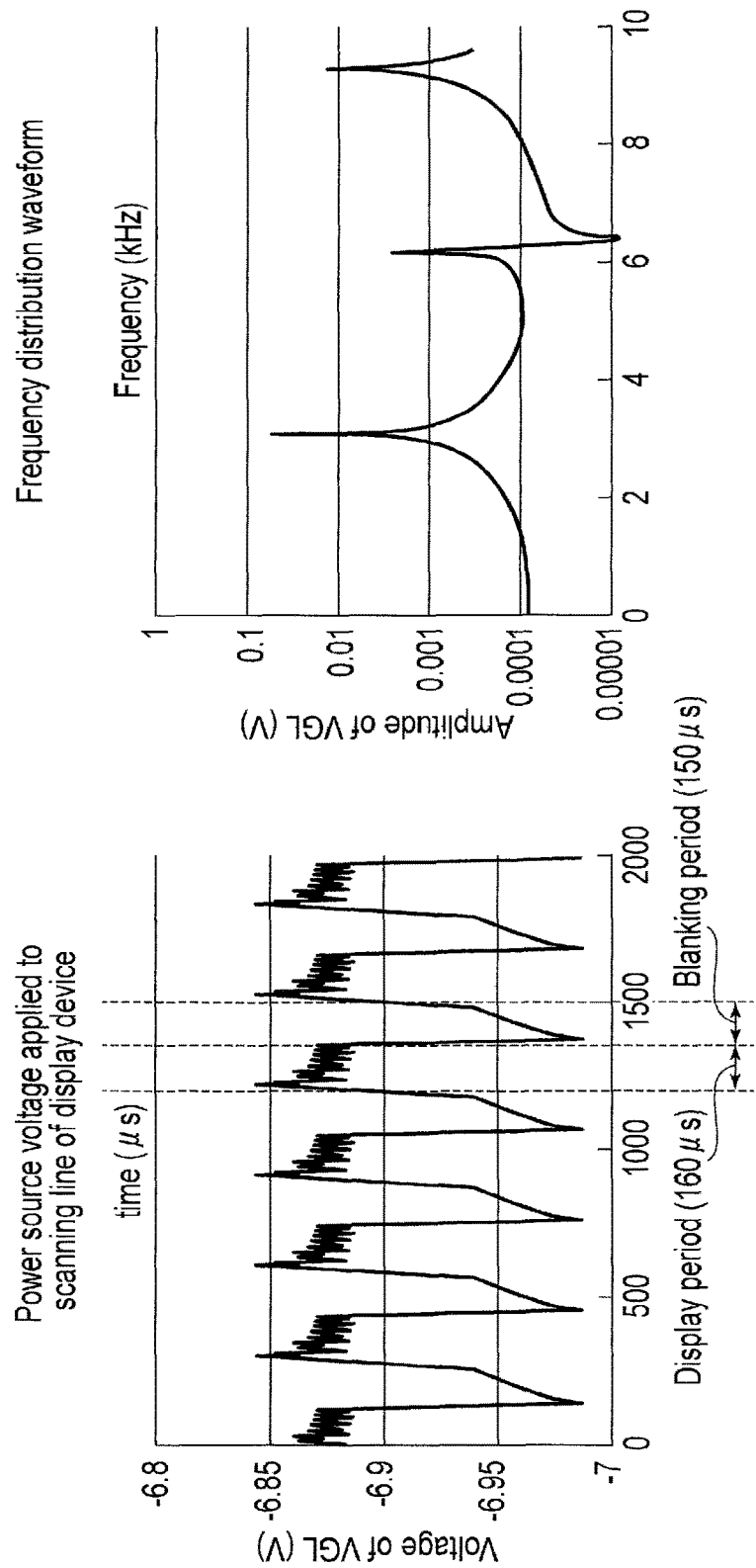
F I G. 3B
F I G. 3A

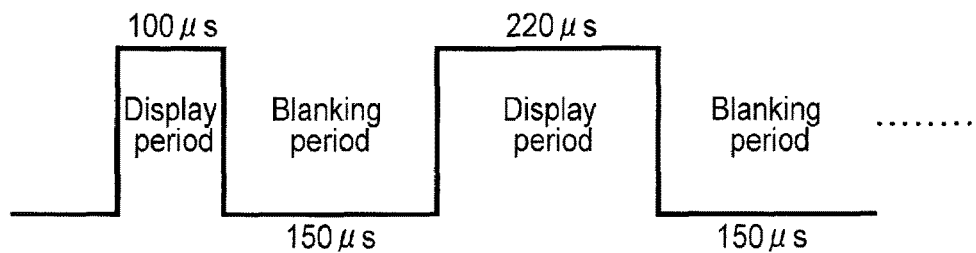
F I G. 6A
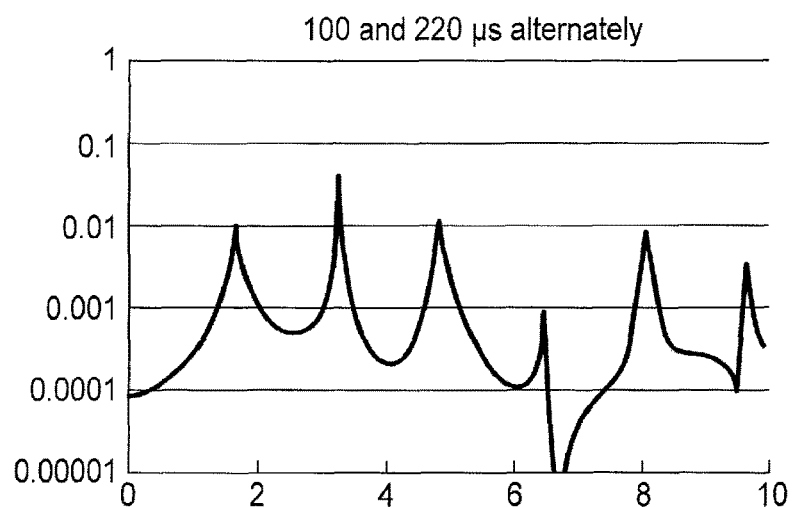
F I G. 6B

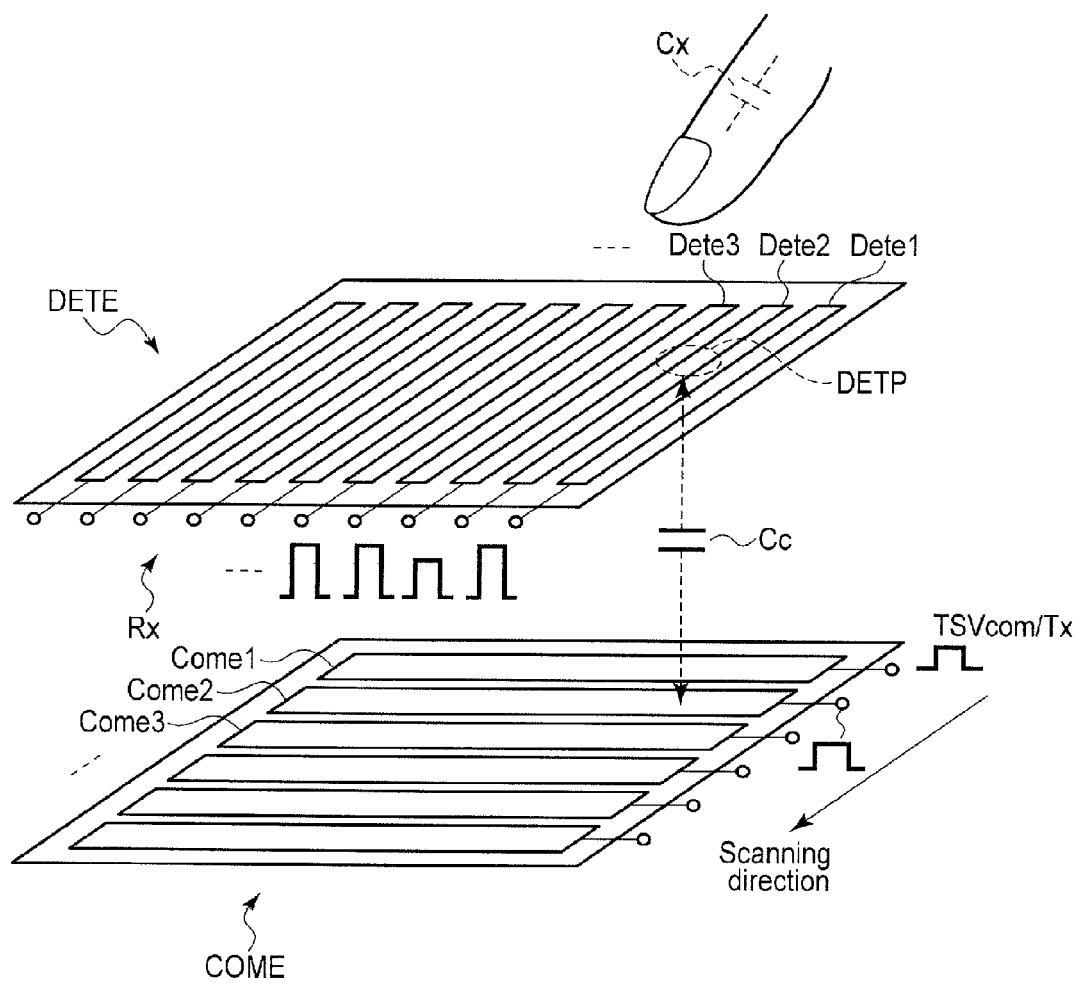
F I G. 8

DISPLAY DEVICE USING AT LEAST TWO TYPES OF DISPLAY PERIODS WITH DIFFERENT LENGTHS

CROSS-REFERENCE TO RELATED APPLICATIONS

This application is based upon and claims the benefit of priority from Japanese Patent Application No. 2014-189705, filed Sep. 18, 2014, the entire contents of which are incorporated herein by reference.

FIELD

Embodiments described herein relate generally to a display device.

BACKGROUND

Recently, a demand for a planar display device, which is characterized by thinness, lightness and low power consumption, and represented by a liquid crystal display device, has been rapidly increasing. In particular, an active matrix display device in which an on-pixel and an off-pixel are electrically separated, and a pixel switch having a function of holding a video signal to the on-pixel is provided in each pixel is used for various displays such as portable information equipment.

Multi V blanking driving in which a pixel signal is supplied to a display element of a display device in every plurality of rows with a blank period provided, and a display device with a touch detection function of supplying a touch detection drive signal to a touch detection element in the blank period different from a display operation period in which the display is scanned are disclosed.

BRIEF DESCRIPTION OF THE DRAWINGS

FIG. 1 is an exemplary figure showing a schematic structure of a display device according to a first embodiment.

FIG. 3A is an exemplary figure for describing noise produced in a display device which has been considered prior to the display device according to the first embodiment.

FIG. 3B is an exemplary figure for describing noise produced in a display device which has been considered prior to the display device according to the first embodiment.

FIG. 6A is an exemplary figure for describing another method of reducing noise in the display device according to the first embodiment.

FIG. 6B is an exemplary figure for describing another method of reducing noise in the display device according to the first embodiment.

FIG. 8 is an exemplary figure showing a representative basic structure of a touchsensor of a mutual detection system of the display device according to the first embodiment.

DETAILED DESCRIPTION

Figure 2A:
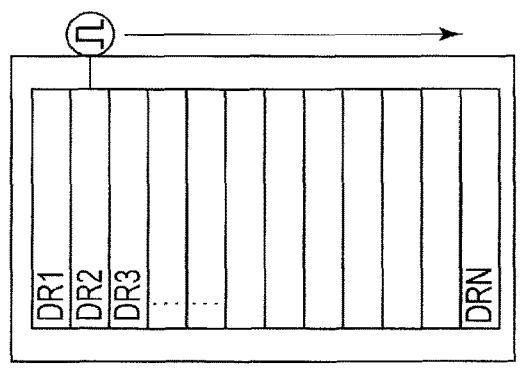
FIG. 2A is an exemplary figure for describing a method of driving the display device according to the first embodiment.

Various embodiments will be described hereinafter with reference to the accompanying drawings.

In general, according to one embodiment, a display device includes a plurality of display elements arranged in a matrix, a plurality of scanning lines extending along the display elements which are arranged in a row direction, a plurality of signal lines extending along the display elements which are arranged in a column direction, and a controller configured to control display by sequentially supplying an image signal and a control signal to the plurality of signal lines and the plurality of scanning lines, respectively, wherein the controller repeats a display period in which the display is controlled and a display blanking period in which the display is paused to display a frame image, and at least two types of display periods with different lengths are used when a frame image is displayed.

It should be noted that disclosure to be made is merely an example, and a change which is to be properly made with the gist of the invention maintained and can be easily conceived by a person with ordinary skill in the art is naturally within the scope of the present invention. Further, the drawings are sometimes schematically shown in terms of a width, thickness, shape, etc., of each module in comparison with an actual form for clarification of description; however, they are just examples and do not limit interpretation of the present invention. Moreover, a structural element similar to that previously described with reference to an already-presented figure will be denoted by the same reference numbers, and their detailed description may be omitted in the specification and each of the drawings.

[First Embodiment]

FIG. 1 is an exemplary figure showing a schematic structure of a display device DSP according to a first embodiment. The display device in this embodiment is a liquid crystal display device.

The display device comprises a display panel PNL, and a backlight BLT configured to illuminate the display panel PNL from the back. The display panel PNL is provided with a display portion including display pixels PX arranged in a matrix.

As shown in FIG. 1, the display portion comprises scanning lines G (G1, G2, . . . ) extending along rows in which a plurality of display pixels PX are arranged, signal lines S (S1, S2, . . . ) extending along columns in which a plurality of display pixels PX are arranged, and pixel switches SW arranged near positions at which the scanning lines G and the signal lines S cross each other.

The pixel switch SW comprises a thin-film transistor (TFT). A gate electrode of the pixel switch SW is electrically connected to a corresponding scanning line G. A source electrode of the pixel switch SW is electrically connected to a corresponding signal line S. A drain electrode of the pixel switch SW is electrically connected to a pixel electrode PE.

Further, a gate driver GD (GD-L [left] and GD-R [right]) and a source driver SD are provided as a driver configured to drive a plurality of display pixels PX. A plurality of scanning lines G are electrically connected to output terminals of the gate driver GD. A plurality of signal lines S are electrically connected to output terminals of the source driver SD.

The gate driver GD and the source driver SD are arranged in an area (frame) around the display. The gate driver GD sequentially applies an on-voltage to a plurality of scanning lines G, and supplies the on-voltage to the gate electrodes of the pixel switches SW electrically connected to a selected scanning line G. The source electrode and drain electrode of the pixel switch SW, the gate electrode of which the on-voltage is supplied to, are conducted with each other. The source driver SD supplies a pixel signal corresponding each of the plurality of signal lines S. The pixel signal supplied to each signal line S is applied to a corresponding pixel electrode PE through the pixel switch SW in which the source electrode and drain electrode are conducted.

Operations of the gate driver GD and the source driver SD are controlled by a control circuit CTR arranged outside the display panel PNL. The control circuit CTR supplies a common voltage Vcom to a common electrode COME to be described later. The control circuit CTR further controls an operation of the backlight BLT. It should be noted that a drive circuit configured to drive the common electrode COME may be included in the source driver or the gate driver, and the common electrode COME may be driven by a dedicated common electrode driver.

Figure 2B:
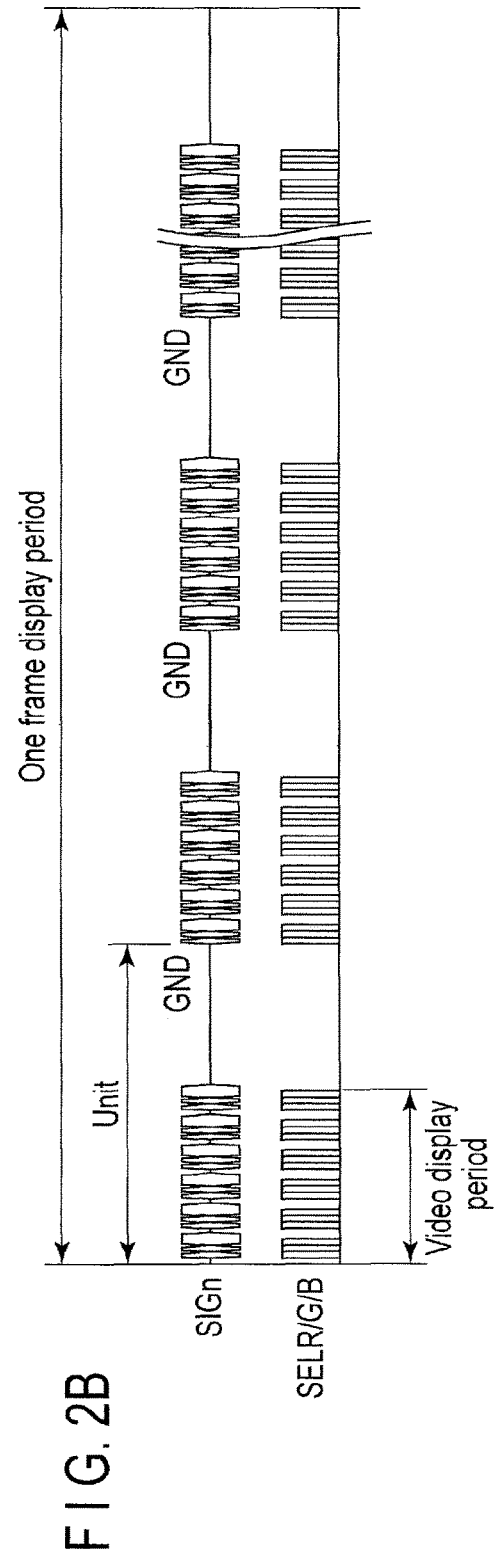
FIG. 2B is an exemplary figure for describing a method of driving the display device according to the first embodiment.

FIGS. 2A and 2B are exemplary figures for describing a method of driving the display device DSP according to the first embodiment.

FIG. 2A shows a drive unit DRn of the display pixel PX. Each of the drive units DR1, . . . , DRN is constituted of successive display pixel rows. A video display operation is sequentially executed in each of the drive units DR1 to DRn in the display device DSP according to the first embodiment.

FIG. 2B shows a driving method. In this driving method, one frame period is constituted of a plurality of units. One unit is divided into a period in which video is being displayed (a displayed period) and a period in which video displaying is paused (a blanking period). That is, the frame period is constituted by alternately repeating divided video display periods and divided blanking periods. After an operation of outputting a display signal (SIGn) for each color in response to a signal (SELR/G/B) for selecting three colors of RGB is executed for a plurality of display rows, the display operation stops in the blanking period. The operation is sequentially repeatedly executed for the plurality of display rows in one drive unit DRn. It should be noted that an operation corresponding to a function of the display device DSP other than a display function can be executed in the blanking period. For example, when the display device DSP has a touch detection function, a driving operation for detecting a touch position can be executed in the blanking period. This operation will be described in detail later.

FIGS. 3A and 3B are exemplary figures for describing noise produced in a display device DSP which has been considered prior to the display device DSP according to the first embodiment.

FIG. 3A shows change of a low-level power source voltage (VGL) used in the display device DSP. When the on-voltage (here, low-level voltage) is applied to the scanning line G in the display period, a source electrode and a drain electrode of a corresponding pixel switch SW are conducted. It should be noted that the pixel switch SW is a P-channel transistor. The power source voltage (VGL) is reduced by increase of a load caused by applying the low-level voltage to the scanning line G. That is, the power source voltage (VGL) changes in a direction approaching zero (upper direction in FIG. 3A). Since the low-level voltage is sequentially switched and applied to a plurality of scanning lines G in the display period of one unit, the level of the power source voltage (VGL) is kept in a reduced state with the power source voltage fluctuated by the switching.

Conversely, the low-level voltage is not applied to the scanning line G while the display operation stops, that is, in the blanking period. Thus, the power source voltage (VGL) returns to an original state. That is, the power source voltage (VGL) changes in a direction away from zero (lower direction in FIG. 3A). Thus, a power source voltage (VGL) waveform is a periodic waveform in which the display period (160 µs) and the blanking period (150 µs) are alternately repeated, one period of which is 310 µs (=160+150).

FIG. 3B is a schematic view showing a frequency distribution waveform obtained by analyzing a frequency of a transition waveform of the power source voltage (VGL) shown in FIG. 3A. It shows that approximately 3.2 kHz ($=10^6/310$) which is a basic frequency corresponding to one period (310 µs) of the power source voltage (VGL) waveform and harmonic frequencies have high intensity. Both of the basic frequency and the harmonic frequencies shown in FIG. 3B are in an audible area. Thus, if the driving method of the display device DSP according to the first embodiment is used, acoustic noise may be produced by change of the power source voltage.

Figures 4A, 4B:
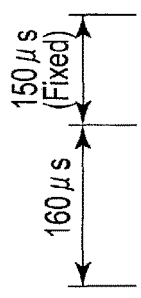
FIG. 4A is an exemplary figure for describing a method of reducing noise in the display device according to the first embodiment.
FIG. 4B is an exemplary figure for describing a method of reducing noise in the display device according to the first embodiment.

FIGS. 4A and 4B are exemplary figures for describing a method of reducing noise in the display device DSP according to the first embodiment.

The above noise is produced by a periodically changing power source voltage. The noise is reduced by dispersing a frequency of voltage change of the power source, reducing periodicity. That is, as shown in FIG. 4A, the time length of a display period Dn is variable. The time length of the blanking period is fixed in the present embodiment.

FIG. 4B shows an example of setting the display period Dn for dispersing a frequency. 16 display lines are included in one display period D in a fixed method. A period of 10 µs is required to display one line. That is, one display period is 160 µs in the fixed method. Conversely, in a variable method shown in FIG. 4B, four display lines are included in the first display period D1, and the number of display lines increases by one as the display period D increases by one. After the display period D26 including 28 display lines, four display lines are included in the display period D27, and the number of display lines increases by one as the display period D increases by one. In the present embodiment, a display period and a blanking period are provided in one frame. In other words, the number of display lines increases as the display period proceeds as the first display period, the second display period, the third display period and so on.

Figure 5A:
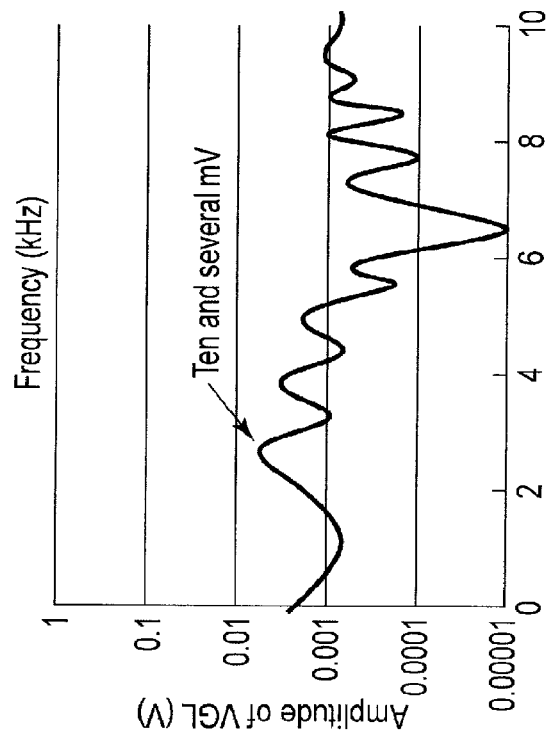
FIG. 5A is an exemplary figure showing noise produced in the display device according to the first embodiment.
Figure 5B:
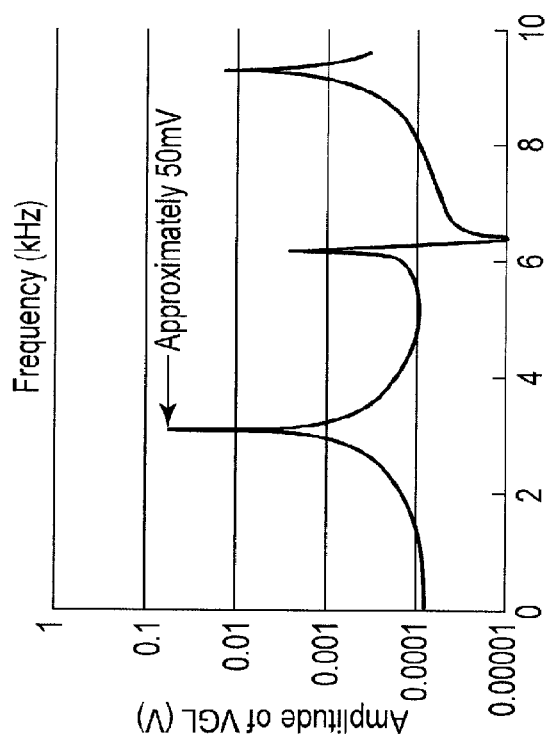
FIG. 5B is an exemplary figure showing noise produced in the display device according to the first embodiment.

FIGS. 5A and 5B are exemplary figures showing noise produced in the display device DSP according to the first embodiment.

FIG. 5A shows frequency distribution of noise produced when it is driven with the number of display lines fixed. FIG. 5B shows frequency distribution of noise produced when the number of display lines is variable as described above.

Although a basic frequency is prominently observed at intensity of approximately 50 mV in the fixed method as shown in FIG. 5A, a prominent frequency is not observed in the variable method as shown in FIG. 5B, and even the intensity with the highest frequency is ten and several millivolts, which is a low value, and is less than or equal to one third. As a result, the variable method suppresses production of noise, for example, acoustic noise caused by change of the power source voltage.

The embodiment in which the number of display lines is variable is not limited to the example shown in FIG. 4B, and can be set to suppress periodicity and not to repeat the same value. The number of lines in the display period D may increase by two every two periods, for example, 3, 3, 5, 5, 7, 7, . . . , or may increase by three every three periods, for example, 5, 5, 5, 8, 8, 8, . . . , with an initial value being an odd number. The number may not only monotonously increase but also monotonously decrease, and increase and decrease may be properly periodically repeated.

The above driving method in which the time length of the display period is variable can be easily realized using registers, for example, three registers of (1) the number of display lines of the first display period, (2) a unit of a display period which increases (decreases), and (3) the number of display lines which increases (decreases). The number of display lines can be monotonously increased (decreased) by controlling the display in accordance with this register setting. The method in which the registers are used will be described later.

Note that the method of varying the number of lines in a display period is not limited to that described above. The number of lines may be changed randomly, or by a predetermined pattern other than the above. Further, such various patterns can be set in the registers.

Next, another method of reducing the noise in the display device DSP according to the first embodiment is described.

As shown in FIG. 4A, the display period and the blanking period are alternately repeated in the display device DSP according to the first embodiment in such an order as the display period (160 μs), the blanking period (150 μs), the display period (160 μs) and the blanking period (150 μs). To restrict such periodicity of periods, for example, time allocation of two consecutive display periods can be changed with the total time kept unchanged. Since the total time of the two display periods is 320 μs (100 μs+220 μs), the time of an odd-numbered display period is 100 μs, and that of an even-numbered display period is 220 μs. This also corresponds to a case where the number of display lines of an odd-numbered display period is 10, and that of an even-numbered display period is 22.

FIGS. 6A and 6B are exemplary figures for describing another method of reducing noise in the display device DSP according to the first embodiment.

FIG. 6A shows time transition of the display period and blanking period. The order of the display period (100 μs), the blanking period (150 μs), the display period (220 μs) and the blanking period (150 μs) is repeated as a basic period. From a broad perspective, this is a repeated signal based on the period of 620 μs (=100 μs+150 μs+220 μs+150 μs).

FIG. 6B shows a frequency distribution waveform obtained by analyzing a frequency of a transition waveform of the power source voltage (VGL) shown in FIG. 6A. It shows that approximately 1.6 kHz (=$10^6$/620) which is a basic frequency corresponding to one period (620 μs) of the waveform and harmonic frequencies have high intensity. The value is lower than that of the noise intensity shown in FIG. 3B, and a noise reduction effect is recognized.

Figure 7A:
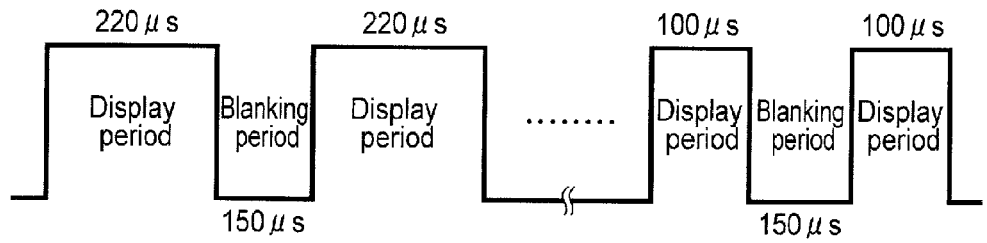
FIG. 7A is an exemplary figure for describing yet another method of reducing noise in the display device according to the first embodiment.
Figure 7B:
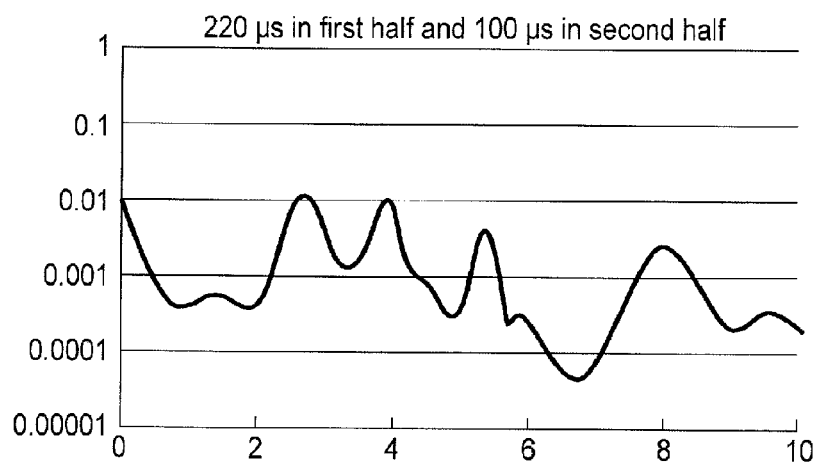
FIG. 7B is an exemplary figure for describing yet another method of reducing noise in the display device according to the first embodiment.

FIGS. 7A and 7B are exemplary figures for describing yet another method of reducing noise in the display device DSP according to the first embodiment.

FIG. 7A shows time transition of the display period and blanking period. In the first half, the order of the display period (220 μs) and the blanking period (150 μs) is repeated, and in the second half, the order of the display period (100 μs) and the blanking period (150 μs) is repeated. From a broad perspective, this is a signal obtained by combining a repeated signal based on the period of 370 μs (=220 μs+150 μs), and that based on the period of 250 μs (=100 μs+150 μs).

FIG. 7B shows a frequency distribution waveform obtained by analyzing a frequency of a transition waveform of the power source voltage (VGL) shown in FIG. 7A. Approximately 2.7 kHz (=$10^6$/370) which is a basic frequency corresponding to one period (370 μs) of the waveform in the first half and harmonic frequencies, and approximately 4.0 kHz (=$10^6$/250) which is a basic frequency corresponding to one period (250 μs) of the waveform in the second half and harmonic frequencies are observed. The values are lower than that of the noise intensity shown in FIG. 3B, and a noise reduction effect is recognized.

The time of the display periods is not limited to 220 and 100 μs, as described above, and two display periods (A and B) fulfilling the requirement that the total time of A and B is 320 μs can be selected. Further, it is not necessarily constituted of two display periods, and may be constituted of at least three display periods.

Next, a form in which a touchsensor is incorporated into the display device is described. The word "touch" refers not only to detecting that a finger, etc., has come into contact with a touchpanel, but also to detecting that a finger, etc., has come close to a touchpanel in the present application.

FIG. 8 is an exemplary figure showing a representative basic structure of a touchsensor of a mutual detection system of the display device DSP according to the first embodiment. The common electrode COME and a detection electrode DETE are used. The common electrode COME includes a plurality of striped common electrodes Come1, Come2, Come3, . . . . The plurality of striped common electrodes Come1, Come2, Come3, . . . are arranged in a scanning (driving) direction (Y- or X-direction).

Conversely, the detection electrode DETE includes a plurality of striped detection electrodes Dete1, Dete2, Dete3, . . . (narrower than striped common electrodes). The plurality of striped detection electrodes Dete1, Dete2, Dete3, . . . are arranged in a direction orthogonal to the striped common electrodes Come1, Come2, Come3, . . . (X- or Y-direction).

The common electrode COME and the detection electrode DETE are arranged at intervals. Thus, capacitance Cc is basically present between the plurality of striped common electrodes Come1, Come2, Come3, . . . , and the plurality of striped detection electrodes Dete1, Dete2, Dete3, . . . .

The plurality of striped common electrodes Come1, Come2, Come3, . . . are scanned by a drive pulse TSVCOM at a predetermined period. Suppose a finger of the user is close to the striped detection electrode Dete2. When the drive pulse TSVCOM is supplied to the striped common electrode Come2, a pulse having an amplitude smaller than that obtained from another striped detection electrode is obtained from the striped detection electrode Dete2. This is because capacitance Cx produced by the finger is added to the capacitance Cc. This pulse having a low detection level can be handled as a detection pulse of a position DETP in mutual detection.

The capacitance Cx differs depending on whether the finger of the user is close to or far from the detection electrode DETE. Thus, the level of the detection pulse also differs depending on whether the finger of the user is close to or far from the detection electrode DETE. This allows proximity of a finger to a plane of a touchpanel to be determined based on the level of the detection pulse. Naturally, a two-dimensional position of the finger on the plane of the touchpanel can be detected based on electrode drive timing of the drive pulse TSVCOM and output timing of the detection pulse.

Figure 9:
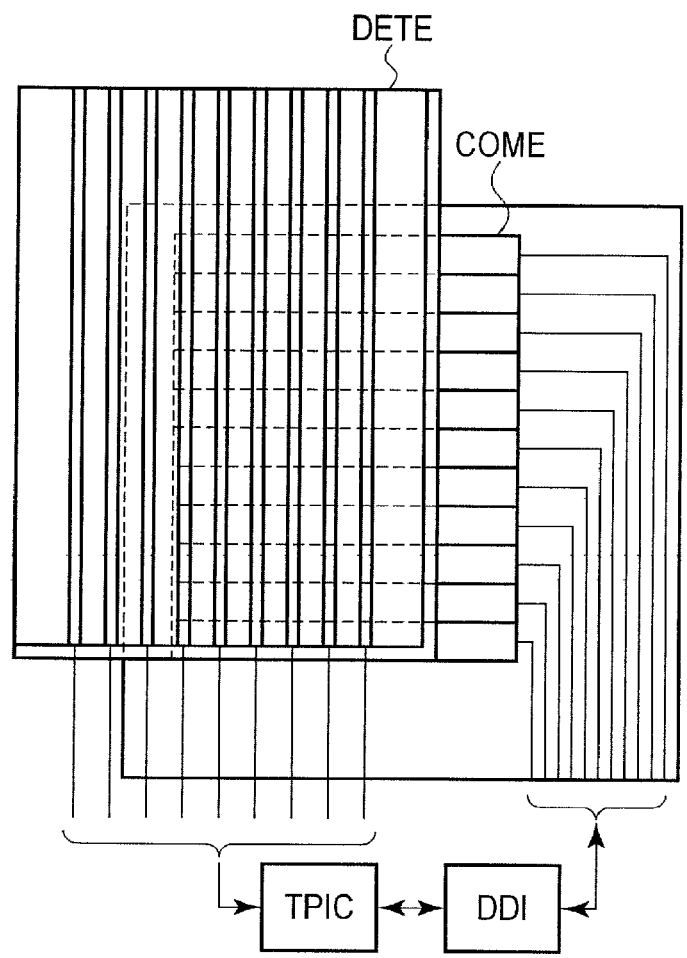
FIG. 9 is an exemplary figure showing a schematic configuration example of a sensor of the display device according to the first embodiment.

FIG. 9 is an exemplary figure showing a schematic configuration example of a sensor of the display device DSP according to the first embodiment. In the display device DSP according to the first embodiment, the drive pulse TSVCOM is input to the common electrode COME through cooperation between a touch driver TPIC and a display driver DDI, and a detection pulse is obtained from the detection electrode DETE. The display driver DDI outputs the drive pulse TSVCOM, and the touch driver TPIC ascertains a contact position of a finger from the position of the common electrode COME to which the drive pulse TSVCOM is input and the waveform of the detection pulse. A touch position can be calculated by an external device not shown.

Figures 10A, 10B:
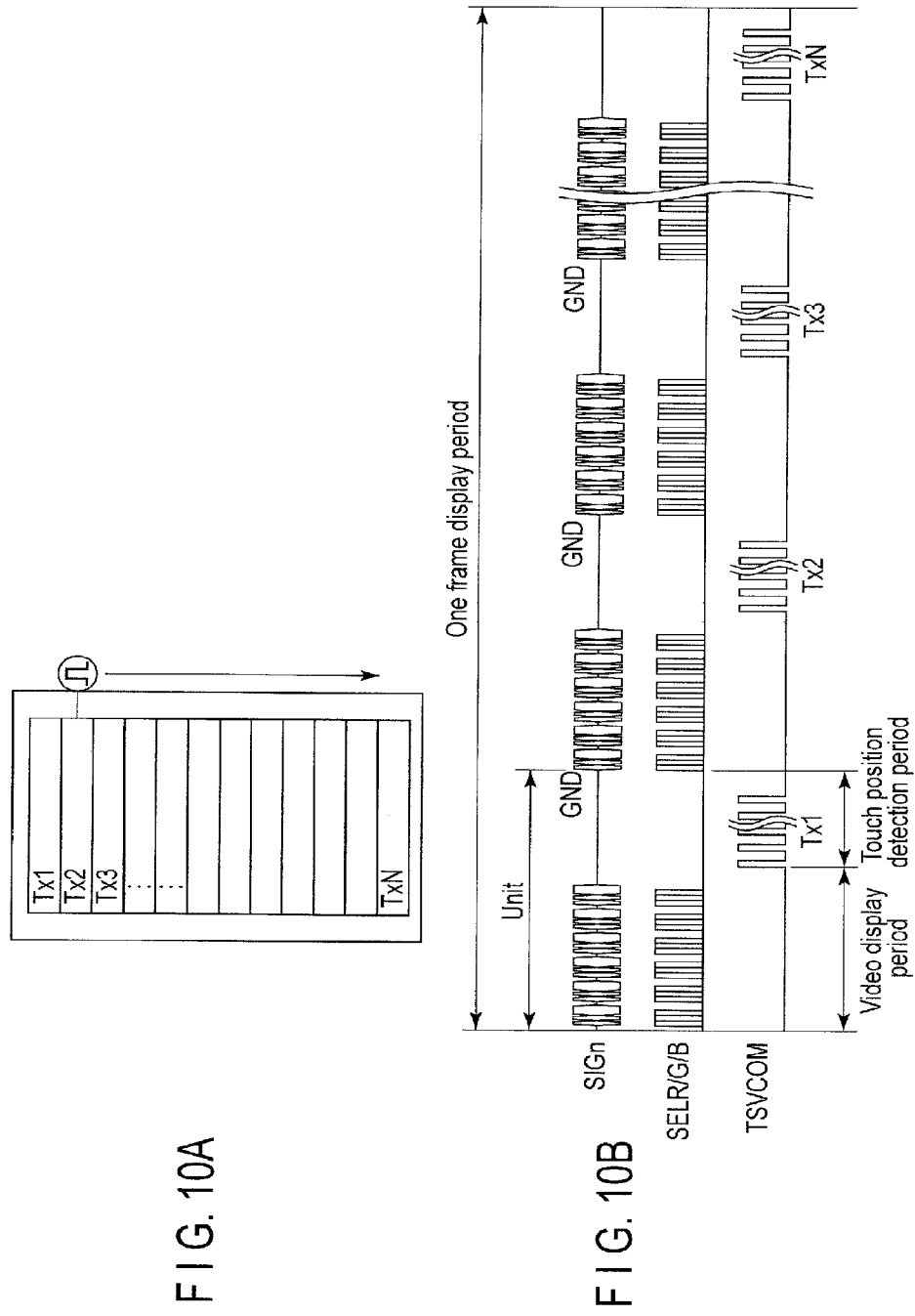
FIG. 10A is an exemplary figure for describing a driving method of the mutual detection system of the display device according to the first embodiment.
FIG. 10B is an exemplary figure for describing a driving method of the mutual detection system of the display device according to the first embodiment.

FIGS. 10A and 10B are exemplary figures for describing a driving method of a mutual detection system of the display device DSP according to the first embodiment.

FIG. 10A shows a drive unit Tx of the common electrode COME. Each of the drive units Tx1, . . . , TxN is constituted of at least one striped common electrode COME. Since the common electrode COME used to display video is used also as an electrode for detecting a touch position in the display device DSP, a video display operation and a touch position detection operation are driven by time sharing.

The operation described in FIG. 2B is executed in a video display period of FIG. 10B. A mutual detection operation for inputting the drive pulse TSVCOM to the drive unit Tx (striped common electrodes COME) is executed in a touch position detection period (period corresponding to the blanking period in FIG. 2B). The display operation of a plurality of divided drive units (DR1, . . . , DRN) and the touch position detection operation of a plurality of drive units Tx (Tx1, . . . , TxN) are sequentially repeatedly executed. Display and touch drive may be synchronized and controlled such that the row of the plurality of drive units Dx and that of the plurality of drive units Tx are at the same position. Alternatively, they may be independently controlled.

Figure 11:
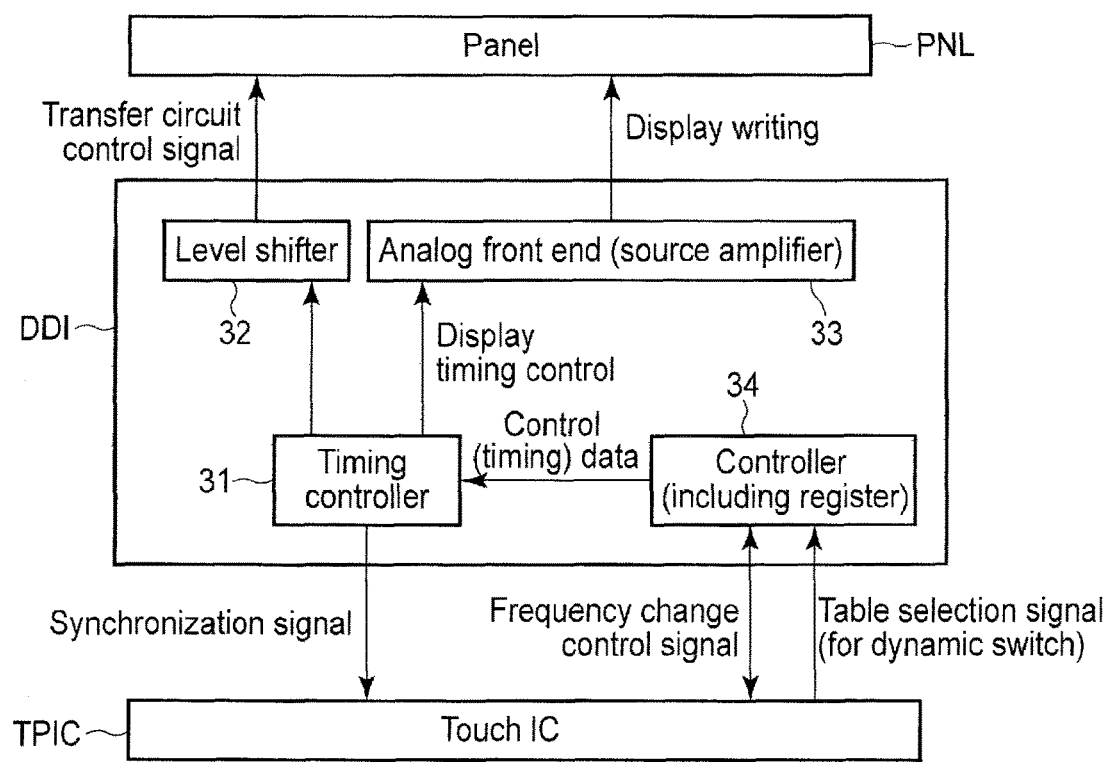
FIG. 11 is an exemplary block diagram showing a structure of a display driver of the display device according to the first embodiment.

FIG. 11 is an exemplary block diagram showing a structure of the display driver DDI of the display device DSP according to the first embodiment. The display driver DDI comprises a timing controller 31, a level shifter 32, an analog front end 33, and a controller 34.

The touch driver TPIC outputs a constant table selection signal for specifying a constant table to the display driver DDI. The constant table selection signal is output when the touch driver TPIC dynamically switches touch operations during operation. The controller 34 sets data described in the specified constant table in an internal register. The timing controller 31 outputs a drive signal for controlling display timing, and a signal for controlling touch drive in accordance with the value set in a register.

That is, the timing controller 31 outputs a synchronization signal to the touch driver TPIC. The timing controller 31 outputs a transfer circuit control signal to a panel PNL through the level shifter 32. The timing controller 31 further outputs a signal for controlling display timing. The analog front end 33 outputs a video signal to the panel PNL in accordance with the control signal.

Frequency shift control for removing disturbance noise can be executed. For example, when a touch signal detected by the touch driver TPIC has a low signal-to-noise ratio, the touch driver TPIC outputs a request signal (TSFRG) to the display driver DDI to reduce a frequency of a touch drive signal. After shifting the frequency of the drive signal, the display driver DDI replies a response signal (TSFST) to the touch driver TPIC. After that, the display driver DDI executes the display operation at the shifted (changed) frequency. Further, touch drive is controlled at the shifted (changed) frequency between the touch driver TPIC and the display driver DDI. This control operation causes, for example, a drive frequency to be dynamically switched between 60 and 120 Hz.

The controller 34 can also dynamically switch the constant table directly, without a constant table selection signal from the touch driver TPIC, to set data described in the switched constant table in an internal register. Thus, the constant table can be dynamically switched even if a touch function is not provided.

Here, a plurality of pairs of constant tables are provided. By setting data described in the plurality of pairs of constant tables in an internal register, the length of the display period (the number of lines), the order of the display period, etc., for, for example, realizing a function shown in FIGS. 4A, 4B, 6A, 6B, 7A and 7B can be specified.

The present invention is not limited to the panel structure described in the embodiment. It can be applied also to a panel in which a lateral electric field liquid crystal such as an in-plane switching (IPS) mode, and a fringe-field switching (FFS) mode is used, and a panel in which a longitudinal electric field liquid crystal such as a twisted nematic (TN) mode, and an optically compensated bend (OCB) mode is used.

Although in the embodiment, a so-called in-cell display device is described as an example of a display device with a touch detection function, a so-called on-cell display device, on a display surface of which a touchpanel is formed, can be also applied. Further, not only the mutual detection system but also, for example, a self detection system in which the drive unit Tx is driven and amplitude variation of Tx is detected can be applied.

Based on the display device which has been described in the above-described embodiments, a person having ordinary skill in the art may achieve a display device with an arbitrary design change; however, as long as they fall within the scope and spirit of the present invention, such a display device is encompassed by the scope of the present invention.

A skilled person would conceive various changes and modifications of the present invention within the scope of the technical concept of the invention, and naturally, such changes and modifications are encompassed by the scope of the present invention. For example, if a skilled person adds/deletes/alters a structural element or design to/from/in the above-described embodiments, or adds/deletes/alters a step or a condition to/from/in the above-described embodiment, as long as they fall within the scope and spirit of the present invention, such addition, deletion, and alteration are encompassed by the scope of the present invention.

Furthermore, regarding the present embodiments, any advantage and effect those will be obvious from the description of the specification or arbitrarily conceived by a skilled person are naturally considered achievable by the present invention.

Various inventions can be achieved by any suitable combination of a plurality of structural elements disclosed in the embodiments. For example, some structural elements may be deleted from the whole structural elements indicated in the above-described embodiments. Furthermore, some structural elements of one embodiment may be combined with other structural elements of another embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a plurality of display elements arranged in a matrix;
a plurality of scanning lines extending along the display elements which are arranged in a row direction;
a plurality of signal lines extending along the display elements which are arranged in a column direction; and
a controller configured to control display by sequentially supplying an image signal and a control signal to the plurality of signal lines and the plurality of scanning lines, respectively,
wherein the controller repeats a display period in which the display is controlled and a display blanking period in which the display is paused to display a frame image, and at least two types of display periods with different lengths are used when a frame image is displayed, and
lengths of the display periods arranged in time sequential order sequentially increase, or sequentially decrease when a frame image is displayed.

2. The display device of claim 1, wherein
the display blanking period with one type of length is used by the controller when a frame image is displayed.

3. The display device of claim 2, wherein
a length of the display period is specified using a number of scanning lines controlled in the display period.

4. The display device of claim 2, further comprising
a touch detector configured to execute a touch driving operation and a detection operation for detecting an external proximity object in the display blanking period.

5. The display device of claim 4, wherein
the touch detector is provided in the display device as an in-cell touchsensor.

6. The display device of claim 1, wherein
data as to how the at least two types of display periods are arranged in time sequential order when a frame image is displayed is transferred from a register, and
the controller controls the display referring to the register.

7. The display device of claim 6, wherein
a plurality of data items as to how the at least two types of display periods are arranged in time sequential order are provided, and
the controller controls the display using a selected data item concerning the arrangement.

8. The display device of claim 6, further comprising
a touch detector configured to execute a touch driving operation and a detection operation for detecting an external proximity object in the display blanking period.

9. The display device of claim 8, wherein
the touch detector is provided in the display device as an in-cell touchsensor.

10. The display device of claim 1, wherein
the display device is controlled at a frequency selected from a plurality of frequencies, and
lengths of the display period and the display blanking period change depending on the selected frequency.

11. The display device of claim 10, wherein
the display device selects a higher frequency as a signal-to-noise ratio of a signal is higher.

12. The display device of claim 10, further comprising
a touch detector configured to execute a touch driving operation and a detection operation for detecting an external proximity object in the display blanking period.

13. The display device of claim 12, wherein
the touch detector is provided in the display device as an in-cell touchsensor.

14. The display device of claim 1, further comprising
a touch detector configured to execute a touch driving operation and a detection operation for detecting an external proximity object in the display blanking period.

15. The display device of claim 14, wherein
the touch detector is provided in the display device as an in-cell touchsensor.

* * * * *